United States Patent [19]
Lindstrom

[11] Patent Number: 6,119,949
[45] Date of Patent: Sep. 19, 2000

[54] APPARATUS AND METHOD FOR PROVIDING A MULTIPLE OPTION SELECT FUNCTION

[75] Inventor: David Eric Lindstrom, St. Louis Park, Minn.

[73] Assignee: Honeywell Inc., Minneapolis, Minn.

[21] Appl. No.: 09/226,371

[22] Filed: Jan. 6, 1999

[51] Int. Cl.$^7$ .......................... G01R 27/08; G05D 15/00
[52] U.S. Cl. ................... 236/20 R; 236/78 D; 165/287; 324/711; 364/528.13
[58] Field of Search ............................... 236/78 D, 20 R; 165/287; 364/528.34, 528.13; 324/711

[56] References Cited

U.S. PATENT DOCUMENTS

| | | | |
|---|---|---|---|
| 3,654,485 | 4/1972 | Lotz | 307/310 |
| 3,958,126 | 5/1976 | Bryant | 250/554 |
| 4,620,667 | 11/1986 | Van Der Meyden et al. | 236/20 R |
| 5,026,270 | 6/1991 | Adams et al. | 431/24 |
| 5,255,975 | 10/1993 | Adams | 165/287 R |
| 5,505,057 | 4/1996 | Sato et al. | 236/78 D |

*Primary Examiner*—William Wayner
*Attorney, Agent, or Firm*—Merchant & Gould P.C.

[57] ABSTRACT

A control system and method provide a multiple option select function in which an option select resistor acts as a selector. The control system determines the resistance value of the resistor and maps the resistance value to a data entry in an option select table. The index of the data entry is determined and used to reference option parameters in at least one option parameter table. The index allows the control system to select an option parameter from many possible option parameters in the option parameter table. Furthermore, additional option parameter tables may also be referenced to select multiple option parameters using a single select resistor. The control system is disclosed as controlling a water heater system, although such control systems may be used to control other systems, such as furnaces and hydronic heating and water systems. A calibrating circuit is used to measure a transient response of an RC circuit. The resistance of the option select resistor is determined from its transient response relative to resistors in the calibration circuit.

20 Claims, 4 Drawing Sheets

APPARATUS AND METHOD FOR PROVIDING A MULTIPLE OPTION SELECT FUNCTION

CROSS REFERENCE TO RELATED APPLICATIONS

This application is related to the subject matter of U.S. patent application Ser. No. 09/225,462, filed Jan. 6, 1999, entitled "APPARATUS AND METHOD FOR DETECTING ELECTRICAL RESISTANCE CHANGE IN CONNECTORS TO A REMOTE MOUNTED SENSOR", which is specifically incorporated herein by reference for all that it discloses and teaches.

BACKGROUND OF THE INVENTION

1. Field of the Invention

The present invention relates generally to electrical systems and devices, and more particularly to apparatus and methods for providing a multiple option select function in a water heater system.

2. Description of Related Art

Modern water heater control systems frequently use microcontrollers to handle a number of complicated gas control and safety functions. In many instances, it is desirable that a system controlled by a microcontroller be configured with certain options, such as a maximum water temperature option. Such options may be, for example, specified in a customer's order. Although such options may be not specified until an order is placed, the manufacturer may choose to substantially assemble and program an inventory of generically configured water heater control systems prior to receiving the customer order. In this business model, it may be desirable to customize the generically configured and programmed control systems just prior to shipment to satisfy customer-specified options. Such customization, for example, may include pre-selecting an option to control operation of the water heater using an option select function. Typically, the generalized software for instructing the microcontroller can be programmed to ascertain the pre-selected option and thereafter to configure the system accordingly.

One method of providing an option select function employs a configurable input/output pin on the microcontroller. As an example, a pin servicing an option select function may select the length of time a gas pre-purge blower will remain on. As another example, a pin servicing an option select function may select the maximum water temperature allowed within the water heater. Various other functional characteristics of a controlled system may be modified via a configurable pin servicing an option select function.

In the most simple implementations, a static or DC option select signal is used to select between two options. A first DC voltage (e.g., high voltage) on an option select pin represents a first option, and a second DC voltage (e.g., low voltage) on the option select pin represents a second option. A microcontroller can observe the voltage on the option select pin to determine the selected option.

Two-state static option select systems have at least two drawbacks. First, the two-state static system is limited to selection of two options. In many configurations, it may be desirable to support more than two options using a single option selector. For example, a water heater control system may be ordered with one of three or more maximum water temperature options selected. Furthermore, it may be desirable to support combinations of multiple categories of options with a single option selector. For example, a water heater control system may be ordered with various combinations of maximum water temperature options and other feature options, such as a selection of a median water temperature. To support additional options or combinations of option categories in a prior art system would typically require more than one input pin on the microcontroller. Input pins are generally in short supply in microcontrollers and thus supporting additional options or combinations of option categories in such systems would compete with other features for this limited resource (i.e., input pins).

A second drawback to prior art static two-state option select systems is that they are not fail-safe. Any circuit failure that leaves the option select signal in a high or low state would be indistinguishable by the microcontroller from a properly selected option. This result is typically undesirable, especially in water heater control systems where the option select signal may control a safety-related option. For example, a failed option select signal could result in an unexpected and dramatic increase in the water temperature, thereby introducing a risk of scalding.

To address the need for a fail-safe option select signal, an alternating signal may be used for one option, and a static signal may be used for a second option. Such a system is described in U.S. Pat. No. 5,026,270 (Adams, et al.) assigned to Honeywell, Inc.

In Adams et al., a signal on a signal option select pin controls a pilot valve trial-time circuit. The trial-time circuit determines the length of time to hold open a gas valve during an ignition attempt. Shorter trial times are obviously safer than longer trial times since there is a short period of time during which uncombusted gas may be vented, if ignition does not occur.

The invention described in Adams works by recognizing an alternating current signal having certain proper characteristics being detected on the option select pin to indicate a first option. The first option corresponds to a long trial time. Any other signal on the option select pin signifies a second option, which indicates a short trial time. Thus, the only failure that would select the longer, or less-safe option, would be a signal similar to the alternating current signal representing the first option. It is assumed in Adams, however, that random generation of the properly characterized alternating signal during a failure mode on the option select pin is highly unlikely. The circuit in Adams is therefore considered to provide fail-safe operation because the most likely failure modes cause selection of the safest option.

Solutions such as Adams, however, do not teach an option select function that provides more than two options or multiple categories of options using a single option selector. Accordingly, need exists for a method and system for providing a multiple option select function.

SUMMARY OF THE INVENTION

Additional needs may be met by embodiments of the present invention. Advantages and novel features are set forth in the description which follows and will become apparent to those skilled in the art when taken in conjunction with the accompanying drawings. The objects and advantages of the invention may be realized and attained by means of the instrumentalities and accommodations particularly pointed out in the appended claims.

To address the foregoing needs and other objects, in accordance with the purposes of the present invention, as embodied and broadly described herein, a system embodiment for providing a multiple option select function comprises a selection circuit for determining an operating value of a circuit element, the operating value being selectable in accordance with the circuit element; an option select table including at least one data entry corresponding to an index value; an option parameter table including at least one option parameter for use in configuring a control system; and a controller circuit for mapping the selected operating value to correspond to the at least one data entry and determining the corresponding index value, the controller circuit being configured to identify the at least one option parameter in the option parameter table based on the index value.

The present invention may also comprise, in accordance with its objects and purposes, a method comprising inserting a selected circuit element into a control system, the selected circuit element having an impedance indicative of control information to be applied to the control system; determining the impedance of the selected circuit element in the control system; mapping the impedance to an index value in an options table for the control system, the index value specifying one or more options in the options table for use by the control system; and setting the control system to options specified by the index value.

DETAILED DESCRIPTION OF THE PREFERRED EMBODIMENT

Embodiments of the invention described herein are generally implemented as logical operations in an intelligent controller in a control system. The logical operations of the present invention are implemented (1) as a sequence of steps directed by program instructions running on an intelligent controller, and (2) as interconnected machine or circuit modules within the intelligent controller. The implementation is a matter of choice, dependent on the performance requirements of the intelligent controller implementing the invention. Accordingly, the logical operations making up embodiments of the present invention described herein are referred to variously as operations, steps, and modules.

Figure 1:
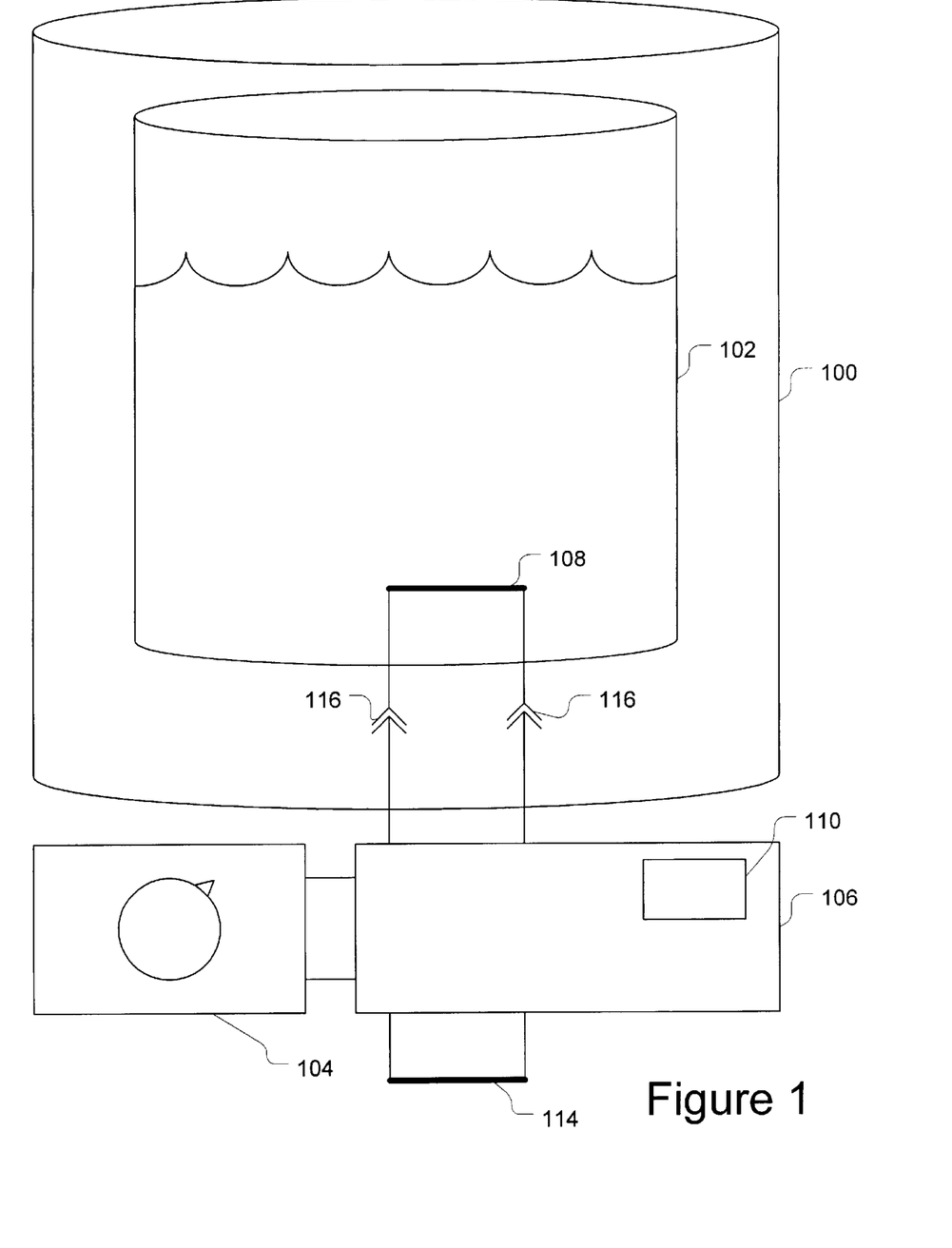
FIG. 1 depicts a water heater system in accordance with the present invention.

FIG. 1 depicts a water heater system in accordance with the present invention. An insulated water heater shell 100 encases an internal tank 102 that holds the water to be supplied into a building's water system, for example. FIG. 1 includes a controller circuit in the form of microcontroller 106 that controls the operation of the water heater. In an exemplary embodiment of the present invention, the microcontroller 106 is a Motorola MC68HC705P6A, described in detail in Motorola 68HC705P6A General Release Specification, Rev. 1.0, Jul. 23, 1996, which is specifically incorporated herein by reference for all that it discloses and teaches. Other microcontrollers are also contemplated within the scope of this invention, including without limitation MC68HC05P4 microcontrollers from Motorola, Inc.

The microcontroller 106 is coupled to a setpoint temperature control 104, which in an embodiment of the present invention includes a 10K linear potentiometer with a 20% tolerance. The setpoint temperature control 104 can be rotated by a consumer to set the desired temperature of the water in the tank 102. The setpoint temperature control 104 preferably provides a variable resistance across two pins of the microcontroller 106, which corresponds to a position parameter P. The position parameter P is then converted to a setpoint temperature at which a supervisor circuit within the microcontroller 106 maintains the water temperature inside the tank 102 at the setpoint temperature by increasing or decreasing the heat applied to the water inside the tank 102. Also as illustrated in FIG. 1, a temperature sensor 108 is coupled to the microcontroller 106 by the connectors 116 and positioned to sense the temperature of the water contained within the tank 102. Typically, a resistance parameter representing the internal water temperature (e.g., the resistor of sensor 230) is monitored by the microcontroller 106, which increases or decreases the heat applied to the water in the tank in accordance with the desired setpoint temperature.

An option select function preferably employs a selection circuit including an option select resistor 114 coupled to the microcontroller 106. Typically, the option select resistor 114 is installed or modified in accordance with a customer's specification to select an operating characteristic from one or more options or option categories. Memory device 110 is preferably a read-only memory (ROM) device coupled to or integral to the microcontroller 106 that stores program instructions to control the microcontroller 106 operation. Preferably, memory device 110 also stores possible options that can be selected by the option select resistor 114. It should be understood that multiple memory devices may be used to store the program code and options.

Although FIG. 1 depicts a water heater control system, the present invention is not limited to water heaters. Other systems in which a multiple option select function is desired, including without limitation furnaces and hydronic heating and cooling systems, may employ a multiple option select function when embodying the present invention.

Figure 2:
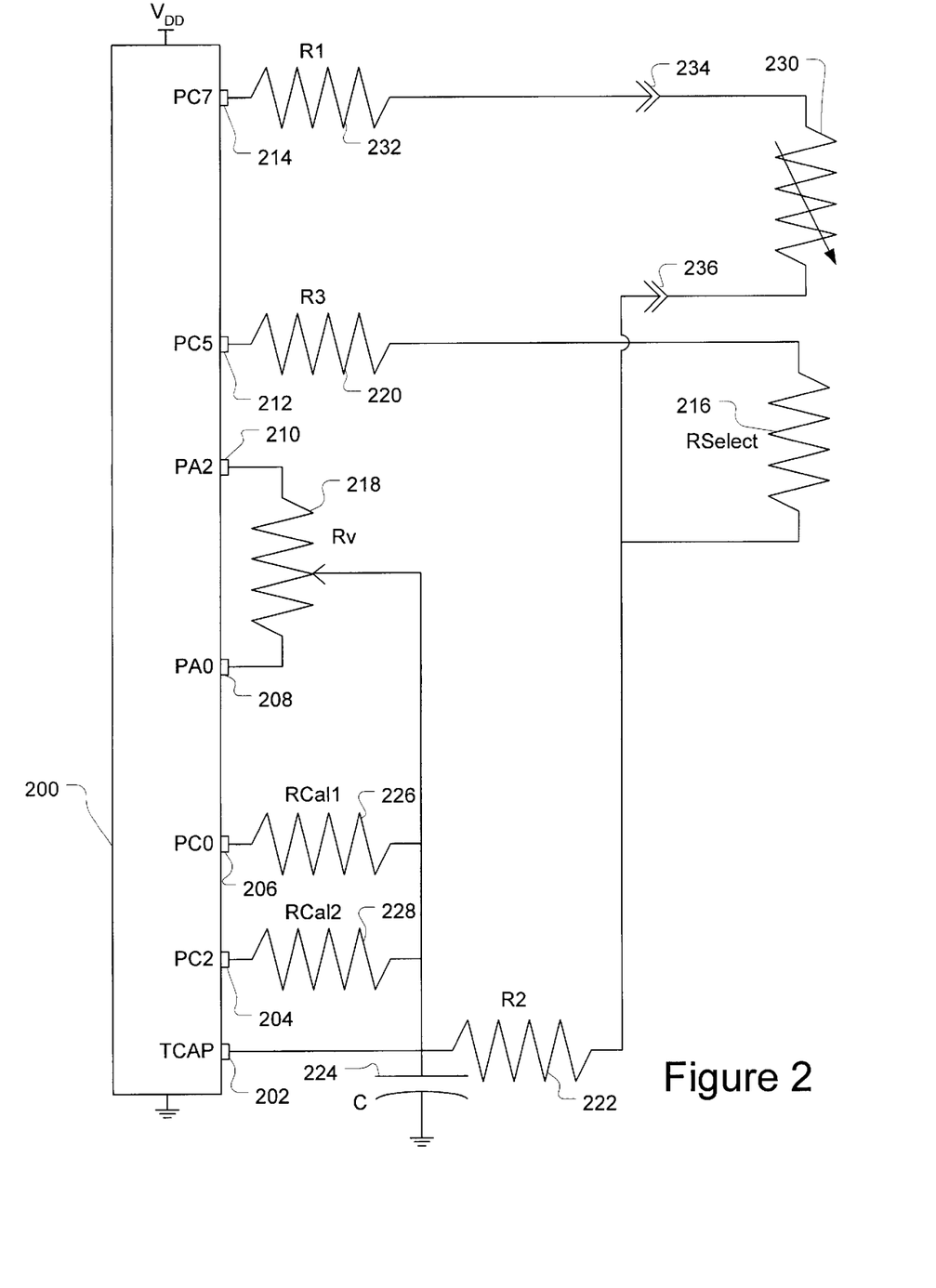
FIG. 2 depicts a schematic diagram of a circuit in accordance with the present invention.

FIG. 2 depicts a schematic diagram of a circuit in accordance with a preferred embodiment of the present invention. A microcontroller 200 preferably includes, among other ports, a capture timer (TCAP) pin 202, an I/O Port A having pins PA0–PA7, an I/O Port B having pins PB5–PB7, and an I/O Port C having pins PC0–PC7. Pin PA0 of I/O Port A is shown at 208 and pin PA2 of I/O Port A is shown at 210. Pin PC0 of I/O Port C is shown at 206, pin PC2 of I/O Port C is shown at 204, pin PC5 of I/O Port C is shown at 212, and pin PC7 of I/O Port C is shown at 214. The pins of I/O Port B are not shown. The TCAP pin 202 is input to a measurement circuit integrated into the microcontroller 200.

Circuitry relating to the option select resistor 114 of FIG. 1, the temperature sensor 108 of FIG. 1, and the setpoint temperature control 104 of FIG. 1 is shown in FIG. 2. The option select resistor is represented in FIG. 2 as a resistor 216 having a resistance value of RSelect. In a typical scenario, the water heater control system is assembled to support multiple possible configurations. Thereafter, in response to customer specification, the resistor 216 is installed to configure the water heater control system to meet customer specifications, such as a maximum water temperature. Rather than merely supporting two options or configurations, it is preferable that the value of resistor 216 be indicative of a selected option or configuration from a substantially unlimited number of options or configuration. The resistance value RSelect specifies to the microcontroller's software which of the multiple options or configurations is selected.

As illustrated, the resistor 216 in series with other resistors is preferably installed between PC5 port 212 and TCAP port 202. The capacitor 224 having capacitance C is electrically connected between the TCAP port 202 and a ground potential. In an embodiment of the present invention, a resistor 220 having a resistance value R3 and resistor 222 having a resistance value R2 are electrically connected in series with the resistor 216, both of which are used to protect against electrostatic discharge and electrical shorts). In a preferred embodiment, R2 and R3 equal 1.0 KΩ with tolerances of 1% and C equals 0.1 µF.

Preferably, a precision resistor 226 having a resistance of RCal1 (e.g., 10KΩ with a 0.1% tolerance) and a precision resistor 228 having a resistance of RCal2 (e.g., 15KΩ with a 0.1% tolerance) are coupled to ports 206 and 204 respectively and are individually coupled in series with capacitor 224, as shown. Resistors 226 and 228 are part of a calibration circuit used to calibrate the transient response of the RC circuits including the capacitor 224, as described in the discussions of FIGS. 2 and 3. In an embodiment of the present invention, the option select circuit of FIG. 2 calibrates a fall time of an RC circuit including the capacitor 224 and one of the resistors 226 and 228. Fall time relates to the time required to discharge the capacitor 224 in such an RC circuit. Alternately, other transient responses such as rise time can be used in this calibration operation. In a preferred embodiment, the fall times of both the RC circuit including the resistor 226 and the RC circuit including the resistor 228 are calibrated.

In accordance with the present invention, an option select function involves a determination of the selected operating value or resistance value RSelect of the resistor 216, which is preferably installed in response to a customer specification. The resistance value RSelect is determined using the fall time (or other corresponding transient response) of an RC circuit including the resistor 216 and the capacitor 224. Once the resistance value RSelect is determined, the microcontroller 200 preferably compares or maps the RSelect value to elements recorded in an Option Select Table, which is an exemplary configuration table stored in the ROM 110 of FIG. 1. If a mapping is successfully made to a valid Option Select Table entry, the index of the mapped entry is used to reference a parameter (shown as Column 2 of Table 1). An RSelect value is said to "map" to an Option Select table entry if it is greater than 85% and less than 115% of the Nominal Resistance (i.e., within a "valid band" of +/−15% of the Nominal Resistance). Regions between valid bands are called "deadbands". The size of each deadband is preferably greater than 10% of the Nominal Resistance of the next valid band. For example, the valid band for the Nominal Resistance of "30.9" (corresponding to row index 4) extends from approximately "26.26" to approximately "35.54". The deadband that precedes the valid band corresponding to "30.9" extends from approximately "22.54" to approximately "26.26". It should be understood that the widths of the deadband can be configured to have different relative or absolute widths (i.e., other than +/−15% or 10%) in accordance with the present invention.

If an RSelect value is mapped to a deadband in the Option Select Table, then the microcontroller 200 causes the water heater to perform a reset. If, however, an RSelect value is mapped to a valid band in the Option Select Table, the corresponding index is used to reference table entries in one or more option parameter tables, such as a Median Water Temperature Table. For example, if the RSelect value is mapped into the valid band corresponding to "30.9", the corresponding index is "4". As such, the RSelect value selects the maximum water temperature setting of 140° F.

In an alternate embodiment, Nominal Resistance values may be chosen arbitrarily or in accordance with other requirements. For example, Table 2 illustrates an Option Select Table including an Index list in Column 1, a Nominal Resistance Table including in Column 2, a Median Temperature Table in Column 3, and a Maximum Temperature Table in Column 4.

| Column 1 Index | Column 2 Nominal Resistance in KΩ | Column 3 Median Water Temperature in ° F. | Column 4 Maximum Water Temperature in ° F. |
| --- | --- | --- | --- |
| 0 | 10 | 125 | 180 |
| 1 | 22 | 125 | 170 |
| 2 | 39 | 140 | 160 |
| 3 | 62 | 130 | 160 |
| 4 | 91 | 125 | 160 |
| 5 | 121 | 120 | 160 |
| 6 | 158 | 130 | 140 | recorded in an option parameter table, such as a Maximum Temperature Table, stored in the ROM 110 of FIG. 1. A computing circuit within the microcontroller 200 then uses the referenced parameter to control operation of the water heater in accordance with the selected option. For example, the index can also be used as a selector for additional categories. That is, the index can be used to reference a parameter recorded in additional tables, such as a Median Water Temperature Table, allowing the single option select resistor to select parameters from more than one option category. It should be understood that, although a preferred embodiment is described as using a ROM to store parameter tables, multiple ROMs, RAMs, or other storage devices may be used to store such tables.

The procedure for mapping the RSelect value to an index in the Option Select table involves comparing the determined RSelect value to Option Select Table entries (i.e., exemplary configuration parameters) representing Nominal Resistance values. For example, Table 1 illustrates an Index list in Column 1, a Nominal Resistance Table in Column 2, and a Maximum Temperature Table in Column 3.

TABLE 1

| Column 1 Index | Column 2 Nominal Resistance in KΩ | Column 3 Maximum Water Temperature in ° F. |
| --- | --- | --- |
| 0 | 4.99 | 160 |
| 1 | 7.87 | 155 |
| 2 | 12.4 | 150 |
| 3 | 19.6 | 145 |
| 4 | 30.9 | 140 |
| 5 | 48.7 | 160 |
| 6 | 76.8 | 155 |
| 7 | 121 | 150 |
| 8 | 191 | 145 |
| 9 | 301 | 140 |

The microcontroller 200 is directed by program instructions to map the determined RSelect value to Nominal Resistance value in the Nominal Resistance Table.

TABLE 2

| 7 | 220 | 125 | 140 |
| --- | --- | --- | --- |
| 8 | 301 | 120 | 140 |

In Table 2, the valid bands extend from 90% to 110% of the Nominal Resistance, and the deadbands are set to fully extend between valid ranges. The Nominal Resistance values may be dictated by other considerations, or may be arbitrarily set.

In FIG. 2, the sensor circuit, including the remote mounted thermistor 230 and the resistors 222 and 232, is used to sense the water temperature within the tank 102 of FIG. 1. Preferably, the thermistor 230 is electrically connected to the microcontroller 200 and associated circuitry by means of connectors 234 and 236. Generally, the resistance of the thermistor 230 changes with temperature, and the microcontroller 200 employs a technique similar to that discussed with regard to FIG. 4 to determine changes in the resistance of the thermistor 230. Such changes in resistance are then preferably applied to a piece-wise linear model to convert the resistance changes into temperature changes, as discussed in U.S. patent application Ser. No. 09/225,462, entitled "APPARATUS AND METHOD FOR DETECTING ELECTRICAL RESISTANCE CHANGE IN CONNECTORS TO A REMOTE MOUNTED SENSOR", filed Jan. 6, 1999, specifically incorporated herein by reference for all that it discloses and teaches. The microcontroller 200 typically monitors such changes in temperature, relative to a setpoint temperature prescribed in the system, to increase or decrease the heat applied to the water within the tank 102.

As illustrated, a variable resistor 218, preferably in the form of a rotary potentiometer, is configured to set the setpoint temperature of the water heater system. In an embodiment employing a rotary potentiometer, the conversion of the position parameter P involves the rotational position of the setpoint temperature control 104 of FIG. 1. In an embodiment of the present invention, one or more mechanical stops are employed to stop full rotation of the setpoint temperature control 104. Generally, the position parameter P ranges from P=0, when the setpoint temperature control 104 is rotated fully counterclockwise against a first mechanical stop, to P=1, where the setpoint temperature control 104 is rotated fully clockwise against the same (or a second) mechanical stop. An alternate embodiment may omit the mechanical stops, where positions P=0 and P=1 are defined by other means. As such, the setpoint temperature control 104 preferably has a definite rotational range in which the positional parameter P may vary.

As discussed, the position parameter P varies with the setpoint temperature of the water heater. In a preferred embodiment, the last four percent of the counterclockwise rotation of the setpoint temperature control 104 (P=0.04, which is labeled Pmin) corresponds to a minimum setpoint temperature (SETPOINTmin) supported by the water heater control system. In addition, the last four percent of the clockwise rotation of the setpoint temperature control 104 (P=0.96, which is labeled Pmax) corresponds to the maximum setpoint temperature (SETPOINTmax) selected by the option select resistor 216. In an embodiment of the present invention, SETPOINTmin equals 60°. Alternately, SETPOINTmin may be selected using the option select function, as shown in Table 2.

The setpoint temperature is actually characterized by two curves: (1) the low-end curve from the minimum setpoint temperature to a median setpoint temperature, which preferably corresponds to P=0.5, and (2) the high-end curve from the median setpoint temperature to the maximum setpoint temperature. In an alternate embodiment, such as characterized by Table 2, the median setpoint temperature may be set by an option select resistor referencing both median and maximum water temperature entries in corresponding tables. Likewise, in yet another embodiment, any combination of minimum, median, and maximum setpoint temperatures may be set in accordance with the present invention.

The low-end curve is defined by the linear equation.

$$y=Mx+b$$

where y equals the setpoint temperature in F°; M equals the slope of a linear portion of the curve, given by (SETPOINTmid−SETPOINTmin)/(Pmid−Pmin); x equals the potentiometer position P; and b equals a Y-intercept of the linear portion of the low-end curve, given by (SETPOINTmid−(M*Pmid)). Likewise, the high-end curve is defined by the same linear equation, except that M is given by (SETPOINTmax−SETPOINTmid)/(Pmax−Pmid).

In a preferred embodiment, look-up tables of slopes and intercepts for the low-end and high-end curves for each of the multiple option configurations are stored in a ROM, such as ROM 110 of FIG. 1.

The potentiometer position P is determined using:

$$P=fpotHi/(fpotHi+fpotLo)$$

where fpotHi is the fall time associated with the resistance between the wiper of Rv and PA2 input of microcontroller 200 (as shown in FIG. 2), and fpotLo is the fall time associated with the resistance between the wiper of Rv and the PA0 input of microcontroller 106 (as shown in FIG. 2). Alternatively, a rise time or other transient response characteristic can be used for this calculation.

Figure 3:
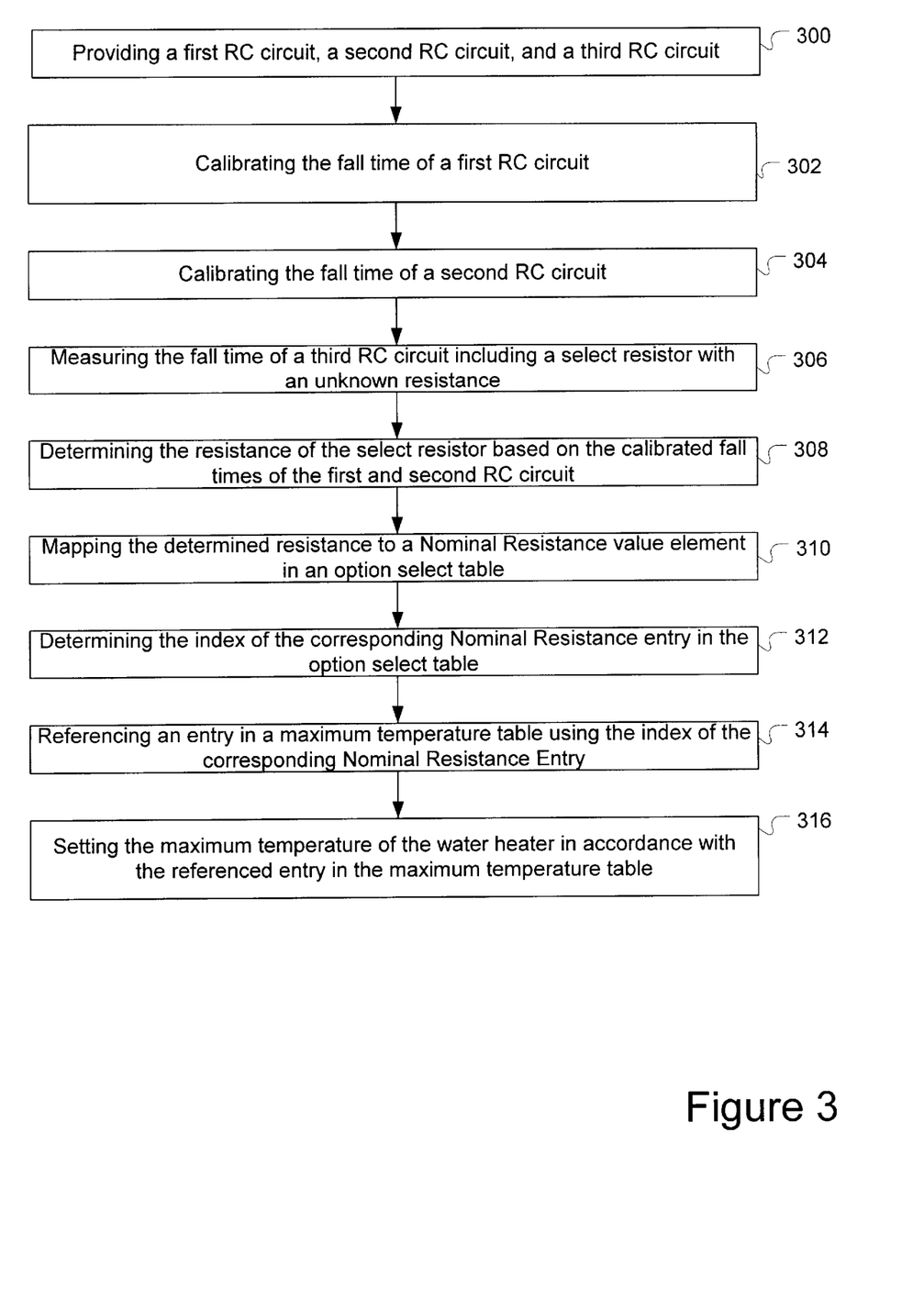
FIG. 3 depicts a flowchart describing a method for providing an option select function in accordance with the present invention.

FIG. 3 depicts a flowchart describing a method for providing an option select function in accordance with the present invention. The flowchart includes operations relating to the circuit of FIG. 2. Operation 300 provides an option select circuit similar to that of FIG. 2, preferably including at least the microcontroller 200, the resistors, 216, 226 and 228, and the capacitor 224. In operation 302, the fall time of a first RC circuit is calibrated. The first RC circuit preferably includes the resistor 226 and the capacitor 224, and the fall time is measured by the microcontroller 200. In operation 304, the fall time of a second RC circuit is calibrated. The second RC circuit preferably includes the resistor 228 and the capacitor 224, and the fall time is measured by the microcontroller 200. In operation 306, the microcontroller measures the fall time of a third RC circuit, preferably including the resistor 216 and the capacitor 224. The details of the calibration and measurement of operations 302, 304, and 306 are described with regard to FIG. 4.

During each operation 302, 304, and 306, the non-measurement pins (e.g., in operation 302, pin 206 is a measurement pin, and at least pins 202 and 204, 208, 210, 212, and 214 are non-measurement pins) are isolated from the RC circuit being measured. Isolation may be achieved by configuring the non-measurement pins as inputs or by tri-stating the non-measurement pins to present a high-impedance. It should also be understood that rise time, relating to the charging of the capacitor in an RC circuit, or other transient responses can be used in place of the fall time. Operation 308 determines the resistance of the option select resistor (i.e., RSelect). The calibrated fall times relating to the first and second calibration resistors are preferably used in this determination.

Operation 310 maps the determined resistance of the option select resistor with a Nominal Resistance value in the Option Select Table. The mapping involves comparing the resistance to the valid bands associated with the Nominal Resistance values in the Option Select Table and selecting the corresponding Nominal Resistance entry. Operation 312 determines the index associated with the selected Nominal Resistance entry. Using this index, operation 314 preferably references an entry in at least one option parameter table, such as a maximum temperature table, to obtain the selected option or configuration. Using the selected option or configuration, the microcontroller controls the water heater accordingly in operation 316. In a preferred embodiment, the selected option is a maximum water temperature; therefore, the microcontroller limits the valid setpoint temperatures (as set by the setpoint temperature control 104 of FIG. 1), as discussed with regard to FIG. 2.

Figure 4:
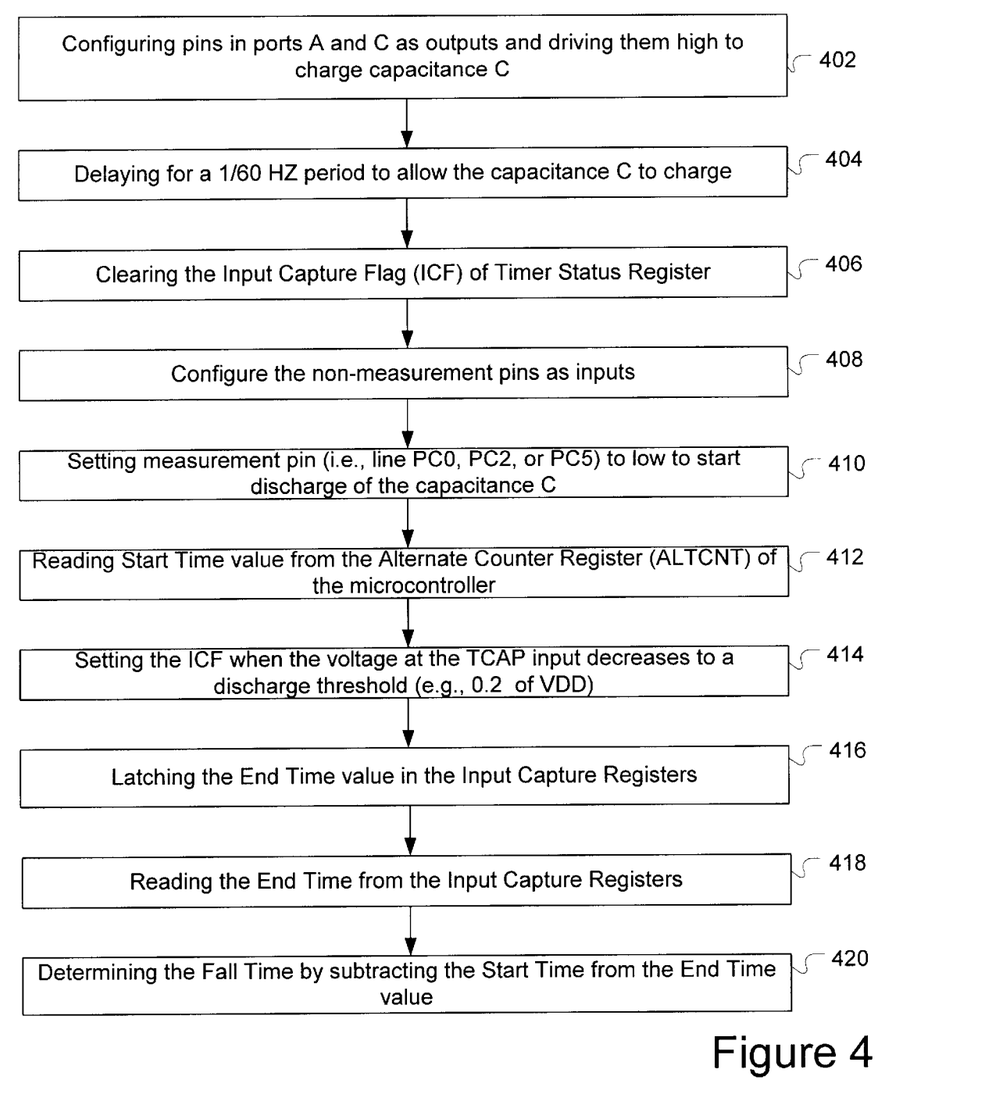
FIG. 4 depicts a flowchart illustrating a fall time measurement process in accordance with the present invention.

FIG. 4 depicts a flowchart illustrating the fall time measurement process in accordance with the present invention. In a preferred embodiment, the timer input capture function of the MC68HC705P6A microcontroller is used to measure the fall times in operations 302, 304, and 306 of FIG. 3. The discharge time of the capacitor 224 of FIG. 2 is captured and converted into a resistance value corresponding to the isolated series resistor in the RC circuit (i.e., the series resistance coupled to a measurement pin). For example, in operation 302, the isolated series resistor is the resistor 226, which is connected in series with the capacitor 224 between the pin 206 and ground. The TCAP port is electrically connected to measure the voltage $V_{tcap}$ across the capacitor 224.

In operation 402, pins coupled to the capacitor 224 (i.e., pins PC0, PC2, PC5, PC7, PA0, and PA2) are configured as outputs and driven high to charge the capacitor 224 (i.e., capacitance C). Operation 404 delays for a 1/60 HZ period, or as long as required to fully charge the capacitor 224. Other preparatory operations (not shown) may also be required, such as clearing the Input Edge (IEDG) bit of the Timer Control Register to indicate that a high to low signal transition triggers a capture at the TCAP port. Alternately, for rise time captures, the IEDG bit is set to indicate that a low to high signal transition triggers a capture. In operation 406, the Input Capture Flag (ICF) of the Timer Status Register is cleared.

In operation 408, the non-measurement pins are set as inputs (or tri-stated) to isolate the measurement pin and its corresponding resistor(s) and the capacitor 224. Operation 410 drives the measurement pin low to start the discharge of the capacitor 224. Concurrently, in operation 412, the Start Time, i.e., the start time of the discharge, is read from the Alternate Counter Register (ALTCNT) in the microcontroller 200. In operation 414, the microcontroller 200 sets the ICF bit when voltage at the TCAP port passes a threshold (e.g., 0.2 of $V_{DD}$ for fall times in the MC68HC705P6A). In a preferred embodiment, an interrupt service routine or another routine can poll the ICF to determine when the capture event has completed. In an alternate embodiment, a completed capture event may invoke a hardware or software interrupt that causes processing to handle the completed event.

Concurrently with the setting of the ICF bit, operation 416 latches the End Time value in the Input Capture Registers, and operation 418 reads the End Time from the Input Capture Registers (high byte, then low byte). In operation 420, the fall time for the measurement pin is determined by subtracting the Start Time value from the End Time value. This process is preferably performed for the RCal1 and RCal2 resistances, as well as for the RSelect resistance. The fall times for these resistances are used to determine the value of RSelect.

The equation for discharge of a simple RC circuit is:

$$V(t)=V_i * e^{-t/RC},$$

where V(t) is the voltage across the capacitor as a function of time, $V_i$ is the initial voltage, and R and C are the resistance and capacitance in the RC circuit. To determine the resistance in an RC circuit having a known fall time and a known capacitance, the fall time of the RC circuit is converted to yield the resistance. In the case of a discharge of a fully charged capacitor, $V_{DD}$ can be substituted for $V_i$, Vtcap can be substituted for V(t) when time $t=T_f$ (i.e., the fall time):

$$T_f = -RC * ln(V_{tcap}/V_{DD}).$$

Although the unknown resistance can be solved from this equation, if the fall time $T_f$ is known, the capacitance C in the circuit illustrated in FIG. 2 can vary up to 35% and $V_{tcap}$ can vary considerably for each device. Furthermore, the resistances of the ports in the circuit must also be considered. Therefore, it is preferably to use two precision resistors having resistances RCal1 and RCal2 for calibration purposes. When the measurement pins are isolated as discussed above:

$$T_{f\_Cal1}=(RCal1+Rport_{Cal1}) * C * ln(V_{tcap}/V_{DD}),$$

and $$T_{f\_Cal2}=(RCal2+Rport_{Cal2}) * C * ln(V_{tcap}/V_{DD}).$$

By assuming $Rport_{Cal1}$ approximates $Rport_{Cal2}$ and by substituting 1/KCal for $C * $ in $(V_{tcap}/V_{DD})$, the equations combine to yield:

$$KCal=(RCal1-RCal2)/(T_{f\_Cal1}-T_{f\_Cal2}).$$

By calibrating with two precision resistances, RCal1 and RCal2, the variability of C, $V_{tcap}$, and the port resistances can be accommodated. Using the KCal equation to solve for a third, unknown resistance, such as RSelect, yields:

$$RSelect=KCal(T_{f\_RSelect}-T_{f\,Cal1})+RCal1,$$

where the resistance values R3 and R2 of FIG. 2 are assumed zero and $T_{f\_RSelect}$ equals the measured fall time of the RC circuit including the capacitor 224 and the resistor 226 having an unknown resistance RSelect. Where R2 and R3 are non-zero, they would impact the fall time of the RSelect RC circuit, and their values must be accommodated. That is, where R2 and R3 are non-zero:

$$RSelect=KCal(T_{f\_RSelect}-T_{f\_Cal1})+RCal1-R2-R3.$$

As discussed above, once the value of RSelect is determined, the microcontroller maps the RSelect value into the Option Select Table to produce an index, which is applied to other corresponding tables to reference selected options, as directed by the option select resistor.

It should be understood that a resistor is an exemplary circuit element, where resistance of the selected resistor is an exemplary operating value. Alternately, operating characteristics of other circuit elements may be employed, including, without limitation, inductance, capacitance, voltage, and frequency.

The above specification, examples and data provide a complete description of the manufacture and use of the composition of the invention. Since many embodiments of the invention can be made without departing from the spirit

11 and scope of the invention, the invention resides in the claims hereinafter appended.

We claim:

1. Apparatus for configuring a control system that controls the environment of a medium, said apparatus comprising:
   a selection circuit determining a selected operating value of a circuit element, said operating value being selectable by selecting the circuit element;
   a controller circuit mapping the selected operating value to an index value in a configuration table, said index value identifying one or more configuration parameters for use by the control system, and said controller circuit providing one or more configuration parameters based on the index value; and
   a supervisor circuit responsive to the controller circuit and setting the control system to a configuration specified by the configuration parameters provided by said controller circuit.

2. The apparatus of claim 1 wherein the circuit element is a resistor, the selected operating value is a resistance and said controller circuit comprises:
   a mapping module mapping the resistance to a range of values;
   an index determining module determining an index to the configuration table based on the range of values to which the resistance was mapped by the mapping module; and
   a referencing module pulling from the configuration table one or more configuration parameters based on the index whereby said controller provides the configuration parameters to said supervisor circuit.

3. The apparatus of claim 2 wherein in the medium is a fluid and said control system is operative to control the temperature of the fluid.

4. The apparatus of claim 1 where said selection circuit comprises:
   a measuring circuit measuring signal characteristics of calibration circuits interacting with a common circuit element that also interacts with said resistor;
   said measuring circuit measuring signal characteristics of said resistor interacting with the common circuit element;
   a computing circuit determining the resistance of said resistor based on the signal characteristics of the calibration circuits interacting with the common circuit element and based on the signal characteristics of said resistor interacting with the common circuit element.

5. A method for providing multiple options to a control system that controls the temperature of a fluid, said method comprising the operations of:
   inserting a selected circuit element into the control system, said selected circuit element having an impedance indicative of control information to be applied to the control system;
   determining the impedance of the selected circuit element in the control system;
   mapping the impedance to an index value in a options table for the control system, said index value specifying one or more options in the options table for use by the control system; and
   setting the control system to options specified by the index value.

6. The method of claim 5 wherein the circuit element is a resistor, the impedance is a resistance and said act of determining further comprises the operations of:

12 measuring signal characteristics of calibration circuits interacting with a common circuit element that also interacts with said resistor;
   measuring signal characteristics of said resistor interacting with the common circuit element;
   computing the resistance of said resistor based on the signal characteristics of the calibration circuits interacting with the common circuit element and based on the signal characteristics of said resistor interacting with the common circuit element.

7. The method of claim 6 wherein the common circuit element is a capacitor and the signal characteristics are related to the resistive and capacitive time constants of the calibration circuits interacting with the capacitor and of the resistor interacting with the capacitor.

8. The method of claim 5 wherein the selected circuit element is a resistor, the impedance is a resistance and said act of mapping further comprises the acts of:
   comparing the resistance to a plurality of reference values; and
   identifying a match between the resistance and a reference value if the resistance is within a predefined tolerance range of the reference value;
   identifying an index value for the options table based on the reference value matched to the resistance; and
   finding one or more options in the options table based on the index value.

9. The method of claim 8 wherein said act of setting comprises the operations of:
   setting a maximum temperature limit on the heating.

10. A water heater control system comprising:
    a selection circuit for determining an operating value of a circuit element, said operating value being selectable in accordance with said circuit element;
    an option select table including at least one data entry corresponding to an index value;
    an option parameter table including at least one option parameter for use in configuring the control system; and
    a controller circuit for mapping said selected operating value to correspond to said at least one data entry and determining said corresponding index value, said controller circuit being configured to identify said one or more option parameters in said option parameter table based on said index value and to configure said control system as specified by said option parameters.

11. The water heater control system of claim 10 wherein said controller circuit configures said control system to control the temperature of water.

12. The water heater control system of claim 10 wherein the option select table defines valid ranges of nominal resistance into which the operating value is mapped to select the at least one option parameter.

13. The water heater control system of claim 10 wherein the option select table defines a deadband that causes the control system to reset if the operating value is mapped thereto.

14. Apparatus for configuring a control system that controls an environment of a medium, said apparatus comprising:
    means for inserting a selected circuit element into the control system, said selected circuit element having an impedance indicative of control information to be applied to the control system;
    means for determining the impedance of the selected circuit element in the control system;

means for mapping the impedance to an index value in a options table for the control system, said index value specifying one or more options in the options table for use by the control system; and means for setting the control system to options specified by the index value.

15. The apparatus of claim 14 wherein the selected circuit element includes a resistor, and further comprising:

means for measuring signal characteristics of calibration circuits interacting with a common circuit element that also interacts with said resistor;

means for measuring signal characteristics of said resistor interacting with the common circuit element; and means for determining the resistance of said resistor based on the signal characteristics of the calibration circuits interacting with the common circuit element and based on the signal characteristics of said resistor interacting with the common circuit element.

16. Apparatus for configuring a control system that controls an environment of a medium, the apparatus comprising:

a selection circuit for determining an operating value of a circuit element, the operating value being selectable in accordance with the circuit element;

an option select table including at least one data entry corresponding to an index value;

an option parameter table including at least one option parameter for use in configuring the control system; and a controller circuit for mapping the selected operating value to correspond to the at least one data entry and determining the corresponding index value, the controller circuit being configured to identify at least one option parameter in the option parameter table based on the index value.

17. The apparatus of claim 16 wherein the controller circuit is further configured to configure the control system as specified by the identified option parameter.

18. The apparatus of claim 16 wherein in the medium is a fluid and the control system is operative to control the temperature of the fluid.

19. The apparatus of claim 16 wherein the option select table defines valid ranges of nominal resistance into which the operating value is mapped to select the at least one option parameter.

20. The apparatus of claim 16 wherein the option select table defines a deadband that causes the control system to reset if the operating value is mapped thereto.

* * * * *

UNITED STATES PATENT AND TRADEMARK OFFICE
CERTIFICATE OF CORRECTION

PATENT NO.   : 6,119,949
DATED        : September 19, 2000
INVENTOR(S)  : David Eric Lindstrom It is certified that error appears in the above-identified patent and that said Letters Patent is hereby corrected as shown below:

Delete columns 1-14 and substitute therefore columns 1-14 as shown on the attached pages.

Signed and Sealed this

Sixth Day of May, 2003

JAMES E. ROGAN
*Director of the United States Patent and Trademark Office*

APPARATUS AND METHOD FOR PROVIDING A MULTIPLE OPTION SELECT FUNCTION

CROSS REFERENCE TO RELATED APPLICATIONS

This application is related to the subject matter of U.S. patent application Ser. No. 09/225,462, filed Jan. 6, 1999, entitled "APPARATUS AND METHOD FOR DETECTING ELECTRICAL RESISTANCE CHANGE IN CONNECTORS TO A REMOTE MOUNTED SENSOR", which is specifically incorporated herein by reference for all that it discloses and teaches.

BACKGROUND OF THE INVENTION

1. Field of the Invention

The present invention relates generally to electrical systems and devices, and more particularly to apparatus and methods for providing a multiple option select function in a water heater system.

2. Description of Related Art

Modern water heater control systems frequently use microcontrollers to handle a number of complicated gas control and safety functions. In many instances, it is desirable that a system controlled by a microcontroller be configured with certain options, such as a maximum water temperature option. Such options may be, for example, specified in a customer's order. Although such options may be not specified until an order is placed, the manufacturer may choose to substantially assemble and program an inventory of generically configured water heater control systems prior to receiving the customer order. In this business model, it may be desirable to customize the generically configured and programmed control systems just prior to shipment to satisfy customer-specified options. Such customization, for example, may include pre-selecting an option to control operation of the water heater using an option select function. Typically, the generalized software for instructing the microcontroller can be programmed to ascertain the pre-selected option and thereafter to configure the system accordingly.

One method of providing an option select function employs a configurable input/output pin on the microcontroller. As an example, a pin servicing an option select function may select the length of time a gas pre-purge blower will remain on. As another example, a pin servicing an option select function may select the maximum water temperature allowed within the water heater. Various other functional characteristics of a controlled system may be modified via a configurable pin servicing an option select function.

In the most simple implementations, a static or DC option select signal is used to select between two options. A first DC voltage (e.g., high voltage) on an option select pin represents a first option, and a second DC voltage (e.g., low voltage) on the option select pin represents a second option. A microcontroller can observe the voltage on the option select pin to determine the selected option.

Two-state static option select systems have at least two drawbacks. First, the two-state static system is limited to selection of two options. In many configurations, it may be desirable to support more than two options using a single option selector. For example, a water heater control system may be ordered with one of three or more maximum water temperature options selected. Furthermore, it may be desirable to support combinations of multiple categories of options with a single option selector. For example, a water heater control system may be ordered with various combinations of maximum water temperature options and other feature options, such as a selection of a median water temperature. To support additional options or combinations of option categories in a prior art system would typically require more than one input pin on the microcontroller. Input pins are generally in short supply in microcontrollers and thus supporting additional options or combinations of option categories in such systems would compete with other features for this limited resource (i.e., input pins).

A second drawback to prior art static two-state option select systems is that they are not fail-safe. Any circuit failure that leaves the option select signal in a high or low state would be indistinguishable by the microcontroller from a properly selected option. This result is typically undesirable, especially in water heater control systems where the option select signal may control a safety-related option. For example, a failed option select signal could result in an unexpected and dramatic increase in the water temperature, thereby introducing a risk of scalding.

To address the need for a fail-safe option select signal, an alternating signal may be used for one option, and a static signal may be used for a second option. Such a system is described in U.S. Pat. No. 5,026,270 (Adams, et al.) assigned to Honeywell, Inc.

In Adams et al., a signal on a signal option select pin controls a pilot valve trial-time circuit. The trial-time circuit determines the length of time to hold open a gas valve during an ignition attempt. Shorter trial times are obviously safer than longer trial times since there is a short period of time during which uncombusted gas may be vented, if ignition does not occur.

The invention described in Adams works by recognizing an alternating current signal having certain proper characteristics being detected on the option select pin to indicate a first option. The first option corresponds to a long trial time. Any other signal on the option select pin signifies a second option, which indicates a short trial time. Thus, the only failure that would select the longer, or less-safe option, would be a signal similar to the alternating current signal representing the first option. It is assumed in Adams, however, that random generation of the properly characterized alternating signal during a failure mode on the option select pin is highly unlikely. The circuit in Adams is therefore considered to provide fail-safe operation because the most likely failure modes cause selection of the safest option.

Solutions such as Adams, however, do not teach an option select function that provides more than two options or multiple categories of options using a single option selector. Accordingly, need exists for a method and system for providing a multiple option, select function.

SUMMARY OF THE INVENTION

Additional needs may be met by embodiments of the present invention. Advantages and novel features are set forth in the description which follows and will become apparent to those skilled in the art when taken in conjunction with the accompanying drawings. The objects and advantages of the invention may be realized and attained by means of the instrumentalities and accommodations particularly pointed out in the appended claims.

To address the foregoing needs and other objects, in accordance with the purposes of the present invention, as embodied and broadly described herein, a system embodiment for providing a multiple option select function comprises a selection circuit for determining an operating value of a circuit element, the operating value being selectable in accordance with the circuit element; an option select table including at least one data entry corresponding to an index value; an option parameter table including at least one option parameter for use in configuring a control system; and a controller circuit for mapping the selected operating value to correspond to the at least one data entry and determining the corresponding index value, the controller circuit being configured to identify the at least one option parameter in the option parameter table based on the index value.

The present invention may also comprise, in accordance with its objects and purposes, a method comprising inserting a selected circuit element into a control system, the selected circuit element having an impedance indicative of control information to be applied to the control system; determining the impedance of the selected circuit element in the control system; mapping the impedance to an index value in an options table for the control system, the index value specifying one or more options in the options table for use by the control system; and setting the control system to options specified by the index value.

BRIEF DESCRIPTION OF THE DRAWINGS

FIG. 1 depicts a water heater system in accordance with the present invention.

FIG. 2 depicts a schematic diagram of a circuit in accordance with the present invention.

FIG. 3 depicts a flowchart describing a method for providing an option select function in accordance with the present invention.

FIG. 4 depicts a flowchart illustrating a fall time measurement process in accordance with the present invention.

DETAILED DESCRIPTION OF THE PREFERRED EMBODIMENT

Embodiments of the invention described herein are generally implemented as logical operations in an intelligent controller in a control system. The logical operations of the present invention are implemented (1) as a sequence of steps directed by programs instructions running on an intelligent controller, and (2) as interconnected machine or circuit modules within the intelligent controller. The implementation is a matter of choice, dependent on the performance requirements of the intelligent controller implementing the invention. Accordingly, the logical operations making up embodiments of the present invention described herein are referred to variously as operations, steps, and modules.

FIG. 1 depicts a water heater system in accordance with the present invention. An insulated water heater shell 100 encases an internal tank 102 that holds the water to be supplied into a building's water system, for example. FIG. 1 includes a controller circuit in the form of microcontroller 106 that controls the operation of the water heater. In an exemplary embodiment of the present invention, the microcontroller 106 is a Motorola MC68HC705P6A, described in detail in Motorola 68HC705P6A General Release Specification, Rev. 1.0, Jul. 23, 1996, which is specifically incorporated herein by reference for all that it discloses and teaches. Other microcontrollers are also contemplated within the scope of this invention, including without limitation MC68HC05P4 microcontrollers from Motorola, Inc.

The microcontroller 106 is coupled to a setpoint temperature control 104, which in an embodiment of the present invention includes a 10K linear potentiometer with a 20% tolerance. The setpoint temperature control 104 can be rotated by a consumer to set the desired temperature of the water in the tank 102. The setpoint temperature control 104 preferably provides a variable resistance across two pins of the microcontroller 106, which corresponds to a position parameter P. The position parameter P is then converted to a setpoint temperature at which a supervisor circuit within the microcontroller 106 maintains the water temperature inside the tank 102 at the setpoint temperature by increasing or decreasing the heat applied to the water inside the tank 102. Also as illustrated in FIG. 1, a temperature sensor 108 is coupled to the microcontroller 106 by connectors 116 and positioned to sense the temperature of the water contained within the tank 102. Typically, a resistance parameter representing the internal water temperature (e.g., the resistor of sensor 230) is monitored by the microcontroller 106, which increases or decreases the heat applied to the water in the tank in accordance with the desired setpoint temperature.

An option select function preferably employs a selection circuit including an option select resistor 114 coupled to the microcontroller 106. Typically, the option select resistor 114 is installed or modified in accordance with a customer's specification to select an operating characteristic from one or more options or option categories. Memory device 110 is preferably a read-only memory (ROM) device coupled to or integral to the microcontroller 106 that stores program instructions to control the microcontroller 106 operation. Preferably, memory device 110 also stores possible options that can be selected by the option select resistor 114. It should be understood that multiple memory devices may be used to store the program code and options.

Although FIG. 1 depicts a water heater control system, the present invention is not limited to water heaters. Other systems in which a multiple option select function is desired, including without limitation furnaces and hydronic heating and cooling systems, may employ a multiple option select function when embodying the present invention.

FIG. 2 depicts a schematic diagram of a circuit in accordance with a preferred embodiment of the present invention. A microcontroller 200 preferably includes, among other ports, a capture timer (TCAP) pin 202, an I/O Port A having pins PA0–PA7, an I/O Port B having pins PB5–PB7, and an I/O Port C having pins PC0–PC7. Pin PA0 of I/O Port A is shown at 208 and pin PA2 of I/O Port A is shown at 210. Pin PC0 of I/O Port C is shown at 206, pin PC2 of I/O Port C is shown at 204, pin PC5 of I/O Port C is shown at 212, and pin PC7 of I/O Port C is shown at 214. The pins of I/O Port B are not shown. The TCAP pin 202 is input to a measurement circuit integrated into the microcontroller 200.

Circuitry relating to the option select resistor 114 of FIG. 1, the temperature sensor 108 of FIG. 1, and the setpoint temperature control 104 of FIG. 1 is shown in FIG. 2. The option select resistor is represented in FIG. 2 as a resistor 216 having a resistance value of RSelect. In a typical scenario, the water heater control system is assembled to support multiple possible configurations. Thereafter, in response to customer specification, the resistor 216 is installed to configure the water heater control system to meet customer specifications, such as a maximum water temperature. Rather than merely supporting two options or configurations, it is preferable that the value of resistor 216 be indicative of a selected option or configuration from a substantially unlimited number of options or configuration. The resistance value RSelect specifies to the microcontroller's software which of the multiple options or configurations is selected.

As illustrated, the resistor 216 in series with other resistors is preferably installed between PC5 port 212 and TCAP port 202. The capacitor 224 having capacitance C is electrically connected between the TCAP port 202 and a ground potential. In an embodiment of the present invention, a resistor 220 having a resistance value R3 and resistor 222 having a resistance value R2 are electrically connected in series with the resistor 216, both of which are used to protect against electrostatic discharge and electrical shorts). In a preferred embodiment, R2 and R3 equal 1.0 K$\Omega$ with tolerances of 1% and C equals 0.1 µF.

Preferably, a precision resistor 226 having a resistance of RCal1 (e.g., 10 K$\Omega$ with a 0.1% tolerance) and a precision resistor 228 having a resistance of RCal2 (e.g., 15 K$\Omega$ with a 0.1% tolerance) are coupled to ports 206 and 204 respectively and are individually coupled in series with capacitor 224, as shown. Resistors 226 and 228 are part of a calibration circuit used to calibrate the transient response of the RC circuits including the capacitor 224, as described in the discussions of FIGS. 2 and 3. In an embodiment of the present invention, the option select circuit of FIG. 2 calibrates a fall time of an RC circuit including the capacitor 224 and one of the resistors 226 and 228. Fall time relates to the time required to discharge the capacitor 224 in such an RC circuit. Alternately, other transient responses such as rise time can be used in this calibration operation. In a preferred embodiment, the fall times of both the RC circuit including the resistor 226 and the RC circuit including the resistor 228 are calibrated.

In accordance with the present invention, an option select function involves a determination of the selected operating value or resistance value RSelect of the resistor 216, which is preferably installed in response to a customer specification. The resistance value RSelect is determined using the fall time (or other corresponding transient response) of an RC circuit including the resistor 216 and the capacitor 224. Once the resistance value RSelect is determined, the microcontroller 200 preferably compares or maps the RSelect value to elements recorded in an Option Select Table, which is an exemplary configuration table, stored in the ROM 110 of FIG. 1. If a mapping is successfully made to a valid Option Select Table entry, the index of the mapped entry is used to reference a parameter recorded in an option parameter table, such as a Maximum Temperature Table, stored in the ROM 110 of FIG. 1. A computing circuit within the microcontroller 200 then uses the referenced parameter to control operation of the water heater in accordance with the selected option. For example, the index can also be used as a selector for additional categories. That is, the index can be used to reference a parameter recorded in additional tables, such as a Median Water Temperature Table, allowing the single option select resistor to select parameters from more than one option category. It should be understood that, although a preferred embodiment is described as using a ROM to store parameter tables, multiple ROMs, RAMs, or other storage devices may be used to store such tables.

The procedure for mapping the RSelect value to an index in the Option Select table involves comparing the determined RSelect value to Option Select Table entries (i.e., exemplary configuration parameters) representing Nominal Resistance values. For example, Table 1 illustrates an Index list in Column 1, a Nominal Resistance Table in Column 2, and a Maximum Temperature Table in Column 3.

TABLE 1

| Column 1 Index | Column 2 Nominal Resistance in K$\Omega$ | Column 3 Maximum Water Temperature in °F. |
|---|---|---|
| 0 | 4.99 | 160 |
| 1 | 7.87 | 155 |
| 2 | 12.4 | 150 |
| 3 | 19.6 | 145 |
| 4 | 30.9 | 140 |
| 5 | 48.7 | 160 |
| 6 | 76.8 | 155 |
| 7 | 121 | 150 |
| 8 | 191 | 145 |
| 9 | 301 | 140 |

The microcontroller 200 is directed by program instructions to map the determined RSelect value to a Nominal Resistance value in the Nominal Resistance Table (shown as Column 2 of Table 1). An RSelect value is said to "map" to an Option Select table entry if it is greater than 85% and less than 115% of the Nominal Resistance (i.e., within a "valid band" of +/−15% of the Nominal Resistance). Regions between valid bands are called "deadbands". The size of each deadband is preferably greater than 10% of the Nominal Resistance of the next valid band. For example, the valid band for the Nominal Resistance of "30.9" (corresponding to row index 4) extends from approximately "26.26" to approximately "35.54". The deadband that precedes the valid band corresponding to "30.9" extends from approximately "22.54" to approximately "26.26". It should be understood that the widths of the deadband can be configured to have different relative or absolute widths (i.e., other than +/−15% or 10%) in accordance with the present invention.

If an RSelect value is mapped to a deadband in the Option Select Table, then the microcontroller 200 causes the water heater to perform a reset. If, however, an RSelect value is mapped to a valid band in the Option Select Table, the corresponding index is used to reference table entries in one or more option parameter tables, such as a Median Water Temperature Table. For example, if the RSelect value is mapped into the valid band corresponding to "30.9" the corresponding index is "4". As such, the RSelect value selects the maximum water temperature setting of 140° F.

In an alternate embodiment, Nominal Resistance values may be chosen arbitrarily or in accordance with other requirements. For example, Table 2 illustrates an Option Select Table including an Index list in Column 1, a Nominal Resistance Table including in Column 2, a Median Temperature Table in Column 3, and a Maximum Temperature Table in Column 4.

TABLE 2

| Column 1 Index | Column 2 Nominal Resistance in K$\Omega$ | Column 3 Median Water Temperature in °F. | Column 4 Maximum Water Temperature in °F. |
|---|---|---|---|
| 0 | 10 | 125 | 180 |
| 1 | 22 | 125 | 170 |
| 2 | 39 | 140 | 160 |
| 3 | 62 | 130 | 160 |
| 4 | 91 | 125 | 160 |
| 5 | 121 | 120 | 160 |
| 6 | 158 | 130 | 140 |
| 7 | 220 | 125 | 140 |
| 8 | 301 | 120 | 140 |

In Table 2, the valid bands extend from 90% to 110% of the Nominal Resistance, and the deadbands are set to fully extend between valid ranges. The Nominal Resistance values may be dictated by other considerations, or may be arbitrarily set.

In FIG. 2, the sensor circuit, including the remote mounted thermistor 230 and the resistors 222 and 232, is used to sense the water temperature within the tank 102 of FIG. 1. Preferably, the thermistor 230 is electrically connected to the microcontroller 200 and associated circuitry by means of connectors 234 and 236. Generally, the resistance of the thermistor 230 changes with temperature, and the microcontroller 200 employs a technique similar to that discussed with regard to FIG. 4 to determine changes in the resistance of the thermistor 230. Such changes in resistance are then preferably applied to a piece-wise linear model to convert the resistance changes into temperature changes, as discussed in U.S. patent application Ser. No. 09/225,462, titled "APPARATUS AND METHOD FOR DETECTING ELECTRICAL RESISTANCE CHANGE IN CONNECTORS TO A REMOTE MOUNTED SENSOR", filed Jan. 6, 1999, specifically incorporated herein by reference for all that it discloses and teaches. The microcontroller 200 typically monitors such changes in temperature, relative to a setpoint temperature prescribed in the system, to increase or decrease the heat applied to the water within the tank 102.

As illustrated, a variable resistor 218, preferably in the form of a rotary potentiometer, is configured to set the setpoint temperature of the water heater system. In an embodiment employing a rotary potentiometer, the conversion of the position parameter P involves the rotational position of the setpoint temperature control 104 of FIG. 1. In an embodiment of the present invention, one or more mechanical stops are employed to stop full rotation of the setpoint temperature control 104. Generally, the position parameter P ranges from P=0, when the setpoint temperature control 104 is rotated fully counterclockwise against a first mechanical stop, to P=1, where the setpoint temperature control 104 is rotated fully clockwise against the same (or a second) mechanical stop. An alternate embodiment may omit the mechanical stops, where positions P=0 and P=1 are defined by other means. As such, the setpoint temperature control 104 preferably has a definite rotational range in which the positional parameter P may vary.

As discussed, the position parameter P varies with the setpoint temperature of the water heater. In a preferred embodiment, the last four percent of the counterclockwise rotation of the setpoint temperature control 104 (P=0.04, which is labeled Pmin) corresponds to a minimum setpoint temperature (SETPOINTmin) supported by the water heater control system. In addition, the last four percent of the clockwise rotation of the setpoint temperature control 104 (P=0.96, which is labeled Pmax) corresponds to the maximum setpoint temperature (SETPOINTmax) selected by the option select resistor 216. In an embodiment of the present invention, SETPOINTmin equals 60°. Alternately, SETPOINTmin may be selected using the option select function, as shown in Table 2.

The setpoint temperature is actually characterized by two curves: (1) the low-end curve from the minimum setpoint temperature to a median setpoint temperature, which preferably corresponds to P=0.5, and (2) the high-end curve from the median setpoint temperature to the maximum setpoint temperature. In an alternate embodiment, such as characterized by Table 2, the median setpoint temperature may be set by an option select resistor referencing both median and maximum water temperature entries in corresponding tables. Likewise, in yet another embodiment, any combination of minimum, median, and maximum setpoint temperatures may be set in accordance with the present invention.

The low-end curve is defined by the linear equation.

$$y = Mx + b$$

where y equals the setpoint temperature in F°; M equals the slope of a linear portion of the curve, given by (SETPOINTmid−SETPOINTmin)/(Pmid−Pmin); x equals the potentiometer position P; and b equals a Y-intercept of the linear portion of the low-end curve, given by (SETPOINTmid−(M*Pmid)). Likewise, the high-end curve is defined by the same linear equation, except that M is given by (SETPOINTmax−SETPOINTmid)/(Pmax−Pmid).

In a preferred embodiment, look-up tables of slopes and intercepts for the low-end and high-end curves for each of the multiple option configurations are stored in a ROM, such as ROM 110 of FIG. 1.

The potentiometer position P is determined using:

$$P = fpotHi/(fpotHi + fpotLo)$$

where fpotHi is the fall time associated with the resistance between the wiper of Rv and PA2 input of microcontroller 200 (as shown in FIG. 2), and fpotLo is the fall time associated with the resistance between the wiper of Rv and the PA0 input of microcontroller 106 (as shown in FIG. 2). Alternatively, a rise time or other transient response characteristic can be used for this calculation.

FIG. 3 depicts a flowchart describing a method for providing an option select function in accordance with the present invention. The flowchart includes operations relating to the circuit of FIG. 2. Operation 300 provides an option select circuit similar to that of FIG. 2, preferably including at least the microcontroller 200, the resistors, 216, 226 and 228, and the capacitor 224. In operation 302, the fall time of a first RC circuit is calibrated. The first RC circuit preferably includes the resistor 226 and the capacitor 224, and the fall time is measured by the microcontroller 200. In operation 304, the fall time of a second RC circuit is calibrated. The second RC circuit preferably includes the resistor 228 and the capacitor 224, and the fall time is measured by the microcontroller 200. In operation 306, the microcontroller measures the fall time of a third RC circuit, preferably including the resistor 216 and the capacitor 224. The details of the calibration and measurement of operations 302, 304, and 306 are described with regard to FIG. 4.

During each operation 302, 304, and 306, the non-measurement pins (e.g., in operation 302, pin 206 is a measurement pin, and at least pins 202 and 204, 208, 210, 212, and 214 are non-measurement pins) are isolated from the RC circuit being measured. Isolation may be achieved by configuring the non-measurement pins as inputs or by tri-stating the non-measurement pins to present a high-impedance. It should also be understood that rise time, relating to the charging of the capacitor in an RC circuit, or other transient responses can be used in place of the fall time. Operation 308 determines the resistance of the option select resistor (i.e., RSelect). The calibrated fall times relating to the first and second calibration resistors are preferably used in this determination.

Operation 310 maps the determined resistance of the option select resistor with a Nominal Resistance value in the Option Select Table. The mapping involves comparing the resistance to the valid bands associated with the Nominal Resistance values in the Option Select Table and selecting the corresponding Nominal Resistance entry. Operation 312 determines the index associated with the selected Nominal Resistance entry. Using this index, operation 314 preferably references an entry in at least one option parameter table, such as a maximum temperature table, to obtain the selected option or configuration. Using the selected option or configuration, the microcontroller controls the water heater accordingly in operation 316. In a preferred embodiment, the selected option is a maximum water temperature; therefore, the microcontroller limits the valid setpoint temperatures (as set by the setpoint temperature control 104 of FIG. 1), as discussed with regard to FIG. 2.

FIG. 4 depicts a flowchart illustrating the fall time measurement process in accordance with the present invention. In a preferred embodiment, the timer input capture function of the MC68HC705P6A microcontroller is used to measure the fall times in operations 302, 304, and 306 of FIG. 3. The discharge time of the capacitor 224 of FIG. 2 is captured and converted into a resistance value corresponding to the isolated series resistor in the RC circuit (i.e., the series resistance coupled to a measurement pin). For example, in operation 302, the isolated series resistor is the resistor 226, which is connected in series with the capacitor 224 between the pin 206 and ground. The TCAP port is electrically connected to measure the voltage $V_{tcap}$ across the capacitor 224.

In operation 402, pins coupled to the capacitor 224 (i.e., pins PC0, PC2, PC5, PC7, PA0, and PA2) are configured as outputs and driven high to charge the capacitor 224 (i.e., capacitance C). Operation 404 delays for a 1/60 HZ period, or as long as required to fully charge the capacitor 224. Other preparatory operations (not shown) may also be required, such as clearing the Input Edge (IEDG) bit of the Timer Control Register to indicate that a high to low signal transition triggers a capture at the TCAP port. Alternately, for rise time captures, the IEDG bit is set to indicate that a low to high signal transition triggers a capture. In operation 406, the Input Capture Flag (ICF) of the Timer Status Register is cleared.

In operation 408, the non-measurement pins are set as inputs (or tri-stated) to isolate the measurement pin and its corresponding resistor(s) and the capacitor 224. Operation 410 drives the measurement pin low to start the discharge of the capacitor 224. Concurrently, in operation 412, the Start Time, i.e., the start time of the discharge, is read from the Alternate Counter Register (ALTCNT) in the microcontroller 200. In operation 414, the microcontroller 200 sets the ICF bit when voltage at the TCAP port passes a threshold (e.g., 0.2 of $V_{DD}$ for fall times in the MC68HC705P6A). In a preferred embodiment, an interrupt service routine or another routine can poll the ICF to determine when the capture event has completed. In an alternate embodiment, a completed capture event may invoke a hardware or software interrupt that causes processing to handle the completed event.

Concurrently with the setting of the ICF bit, operation 416 latches the End Time value in the Input Capture Registers, and operation 418 reads the End Time from the Input Capture Registers (high byte, then low byte). In operation 420, the fall time for the measurement pin is determined by subtracting the Start Time value from the End Time value. This process is preferably performed for the RCal1 and RCal2 resistances, as well as for the RSelect resistance. The fall times for these resistances are used to determine the value of RSelect.

The equation for discharge of a simple RC circuit is:

$$V(t)=V_i * e^{-t/RC},$$

where V(t) is the voltage across the capacitor as a function of time, $V_i$ is the initial voltage, and R and C are the resistance and capacitance in the RC circuit. To determine the resistance in an RC circuit having a known fall time and a known capacitance, the fall time of the RC circuit is converted to yield the resistance. In the case of a discharge of a fully charged capacitor, $V_{DD}$ can be substituted for $V_i$, Vtcap can be substituted for V(t) when time $t=T_f$ (i.e., the fall time):

$$T_f = -RC * \ln(V_{tcap}/V_{DD}).$$

Although the unknown resistance can be solved from this equation, if the fall time $T_f$ is known, the capacitance C in the circuit illustrated in FIG. 2 can vary up to 35% and $V_{tcap}$ can vary considerably for each device. Furthermore, the resistances of the ports in the circuit must also be considered. Therefore, it is preferably to use two precision resistors having resistances RCal1 and RCal2 for calibration purposes. When the measurement pins are isolated as discussed above:

$$T_{f\_Cal1}=(RCal1+Rport_{Cal1})*C*\ln(V_{tcap1}/V_{DD}),$$ and $$T_{f\_Cal2}=(RCal2+Rport_{Cal2})*C*\ln(V_{tcap2}/V_{DD}).$$

By assuming $Rport_{Cal1}$ approximates $Rport_{Cal2}$ and by substituting 1/KCal for $C*\ln(V_{tcap}/V_{DD})$, the equations combine to yield:

$$KCal=(RCal1-RCal2)/(T_{f\_Cal1}-T_{f\_Cal2}).$$

By calibrating with two precision resistances, RCal1 and RCal2, the variability of C, $V_{tcap}$, and the port resistances can be accommodated. Using the KCal equation to solve for a third, unknown resistance, such as RSelect, yields:

$$RSelect=KCal(T_{f\_RSelect}-T_{f\_Cal1})+RCal1$$

where the resistance values R3 and R2 of FIG. 2 are assumed zero and $T_{f\_RSelect}$ equals the measured fall time of the RC circuit including the capacitor 224 and the resistor 226 having an unknown resistance RSelect. Where R2 and R3 are non-zero, they would impact the fall time of the RSelect RC circuit, and their values must be accommodated. That is, where R2 and R3 are non-zero:

$$RSelect=KCal(T_{f\_RSelect}-T_{f\_Cal1})+RCal1-R2-R3.$$

As discussed above, once the value of RSelect is determined, the microcontroller maps the RSelect value into the Option Select Table to produce an index, which is applied to other corresponding tables to reference selected options, as directed by the option select resistor.

It should be understood that a resistor is an exemplary circuit element, where resistance of the selected resistor is an exemplary operating value. Alternately, operating characteristics of other circuit elements may be employed, including, without limitation, inductance, capacitance, voltage, and frequency.

The above specification, examples and data provide a complete description of the manufacture and use of the composition of the invention. Since many embodiments of the invention can be made without departing from the spirit and scope of the invention, the invention resides in the claims hereinafter appended.

I claim:

1. Apparatus for configuring a control system that controls the environment of a medium, said apparatus comprising:
   a selection circuit determining a selected operating value of a circuit element, said operating value being selectable by selecting the circuit element;

a controller circuit mapping the selected operating value to an index value in a configuration table, said index value identifying one or more configuration parameters for use by the control system, and said controller circuit providing one or more configuration parameters based on the index value; and a supervisor circuit responsive to the controller circuit and setting the control system to a configuration specified by the configuration parameters provided by said controller circuit.

2. The apparatus of claim 1 wherein the circuit element is a resistor, the selected operating value is a resistance and said controller circuit comprises:

a mapping module mapping the resistance to a range of values;

an index determining module determining an index to the configuration table based on the range of values to which the resistance was mapped by the mapping module; and a referencing module pulling from the configuration table one or more configuration parameters based on the index whereby said controller provides the configuration parameters to said supervisor circuit.

3. The apparatus of claim 2 wherein in the medium is a fluid and said control system is operative to control the temperature of the fluid.

4. The apparatus of claim 1 where said selection circuit comprises:

a measuring circuit measuring signal characteristics of calibration circuits interacting with a common circuit element that also interacts with said resistor;

said measuring circuit measuring signal characteristics of said resistor interacting with the common circuit element;

a computing circuit determining the resistance of said resistor based on the signal characteristics of the calibration circuits interacting with the common circuit element and based on the signal characteristics of said resistor interacting with the common circuit element.

5. A method for providing multiple options to a control system that controls the temperature of a fluid, said method comprising the operations of:

inserting a selected circuit element into the control system, said selected circuit element having an impedance indicative of control information to be applied to the control system;

determining the impedance of the selected circuit element in the control system;

mapping the impedance to an index value in a options table for the control system, said index value specifying one or more options in the options table for use by the control system; and setting the control system to options specified by the index value.

6. The method of claim 5 wherein the circuit element is a resistor, the impedance is a resistance and said act of determining further comprises the operations of:

measuring signal characteristics of calibration circuits interacting with a common circuit element that also interacts with said resistor;

measuring signal characteristics of said resistor interacting with the common circuit element;

computing the resistance of said resistor based on the signal characteristics of the calibration circuits interacting with the common circuit element and based on the signal characteristics of said resistor interacting with the common circuit element.

7. The method of claim 6 wherein the common circuit element is a capacitor and the signal characteristics are related to the resistive and capacitive time constants of the calibration circuits interacting with the capacitor and of the resistor interacting with the capacitor.

8. The method of claim 5 wherein the selected circuit element is a resistor, the impedance is a resistance and said act of mapping further comprises the acts of:

comparing the resistance to a plurality of reference values; and identifying a match between the resistance and a reference value if the resistance is within a predefined tolerance range of the reference value;

identifying an index value for the options table based on the reference value matched to the resistance; and finding one or more options in the options table based on the index value.

9. The method of claim 8 wherein said act of setting comprises the operations of:

setting a maximum temperature limit on the heating.

10. A water heater control system comprising:

a selection circuit for determining an operating value of a circuit element, said operating value being selectable in accordance with said circuit element;

an option select table including at least one data entry corresponding to an index value;

an option parameter table including at least one option parameter for use in configuring the control system; and a controller circuit for mapping said selected operating value to correspond to said at least one data entry and determining said corresponding index value, said controller circuit being configured to identify said one or more option parameters in said option parameter table based on said index value and to configure said control system as specified by said option parameters.

11. The water heater control system of claim 10 wherein said controller circuit configures said control system to control the temperature of water.

12. The water heater control system of claim 10 wherein the option select table defines valid ranges of nominal resistance into which the operating value is mapped to select the at least one option parameter.

13. The water heater control system of claim 10 wherein the option select table defines a deadband that causes the control system to reset if the operating value is mapped thereto.

14. Apparatus for configuring a control system that controls an environment of a medium, said apparatus comprising:

means for inserting a selected circuit element into the control system, said selected circuit element having an impedance indicative of control information to be applied to the control system;

means for determining the impedance of the selected circuit element in the control system;

means for mapping the impedance to an index value in a options table for the control system, said index value specifying one or more options in the options table for use by the control system; and means for setting the control system to options specified by the index value.

15. The apparatus of claim 14 wherein the selected circuit element includes a resistor and further comprising:

means for measuring signal characteristics of calibration circuits interacting with a common circuit element that also interacts with said resistor;

means for measuring signal characteristics of said resistor interacting with the common circuit element; and means for determining the resistance of said resistor based on the signal characteristics of the calibration circuits interacting with the common circuit element and based on the signal characteristics of said resistor interacting with the common circuit element.

16. Apparatus for configuring a control system that controls an environment of a medium, the apparatus comprising:

a selection circuit for determining an operating value of a circuit element, the operating value being selectable in accordance with the circuit element;

an option select table including at least one data entry corresponding to an index value;

an option parameter table including at least one option parameter for use in configuring the control system; and a controller circuit for mapping the selected operating value to correspond to the at least one data entry and determining the corresponding index value, the controller circuit being configured to identify at least one option parameter in the option parameter table based on the index value.

17. The apparatus of claim 16 wherein the controller circuit is further configured to configure the control system as specified by the identified option parameter.

18. The apparatus of claim 16 wherein in the medium is a fluid and the control system is operative to control the temperature of the fluid.

19. The apparatus of claim 16 wherein the option select table defines valid ranges of nominal resistance into which the operating value is mapped to select the at least one option parameter.

20. The apparatus of claim 16 wherein the option select table defines a deadband that causes the control system to reset if the operating value is mapped thereto.

* * * * *